Nov. 22, 1966  T. E. COWELL  3,286,473
FIXED INJECTOR AND TURBOPUMP ASSEMBLY
Filed June 26, 1963  2 Sheets-Sheet 1

INVENTOR.
THOMAS E. COWELL
BY
*Donald W. Draver*
ATTORNEY

Nov. 22, 1966 T. E. COWELL 3,286,473
FIXED INJECTOR AND TURBOPUMP ASSEMBLY
Filed June 26, 1963 2 Sheets-Sheet 2

INVENTOR.
THOMAS E. COWELL
BY
Donald W. Graves
ATTORNEY

3,286,473
FIXED INJECTOR AND TURBOPUMP ASSEMBLY
Thomas E. Cowell, Woodland Hills, Calif., assignor to
North American Aviation, Inc.
Filed June 26, 1963, Ser. No. 291,233
2 Claims. (Cl. 60—258)

This invention relates to rocket engines.

More particularly, this invention relates to an integrated pump and turbine system for rocket engines and the like.

The usual practice in rocket engine design and construction is to provide a nozzle of the so-called de Laval bell type with an injector and a system of turbines, pumps and propellant tanks along with the associated control and hydraulic systems to inject propellant into a combustion chamber. Quite commonly, the turbines for driving the separate pumps for fuel and oxidizer is driven by a separate gas generator which necessitates a complicated, large and heavy system.

With the advent of modern missiles and the attendant need for greater payloads and more efficient engine systems, the necessity for providing a savings in weight and size in rocket engines is apparent. Examples of modern engine developments are found in U.S. patent applications, Serial Nos. 27,128 and 27,126 now Patent No. 3,173,250, assigned to the assignee of this invention. With rocket engines of the so-alled E-D or R-F type disclosed in the respective applications, this invention has particular applicability. An example of a compact engine and turbopump assembly is disclosed in U.S. patent application No. 27,705, also assigned to the assignee of this invention.

Briefly, this invention provides an integrated pump and turbine system for thrust producing devices such as rocket engines and the like. Compactly packaged within the engine confines itself is an integral bi-propellant pump which feeds fuel and oxidizer to a stationary injector assembly. One of the propellants is conveyed to a primary injector and into a pre-combustion chamber, while the other propellant is conveyed to a secondary injector. A portion of the second propellent is conveyed to the pre-combustion chamber where it reacts with a portion of the first propellant, thus forming relatively cool combustion gases. These gases pass by turbine blades affixed to or integral with the propellant pumps. This powers the turbine and hence the pumps resulting in a forced feed of the propellants. Since combustion gases emanating from the primary combustion or pre-combustion chamber are rich in one of the propellants, a cooler gas results thus tending to maintain the turbine blades and the secondary injection assembly at reasonable temperatures. After passage by the secondary injection area, total combustion of the oxidizer and fuel takes place in a secondary or main combustion chamber. This production of combustion gases when properly directed provides thrust for the vehicle.

Accordingly, it is an object of this invention to provode a new turbine and pump assembly for rocket engines.

It is a more particular object of this invention to provide an integrated turbine and pump assembly for rocket engines and the like.

Other objects and advantages of this invention will become apparent when taken in conjunction with the accompanying drawings and description in which.

Figure 1:
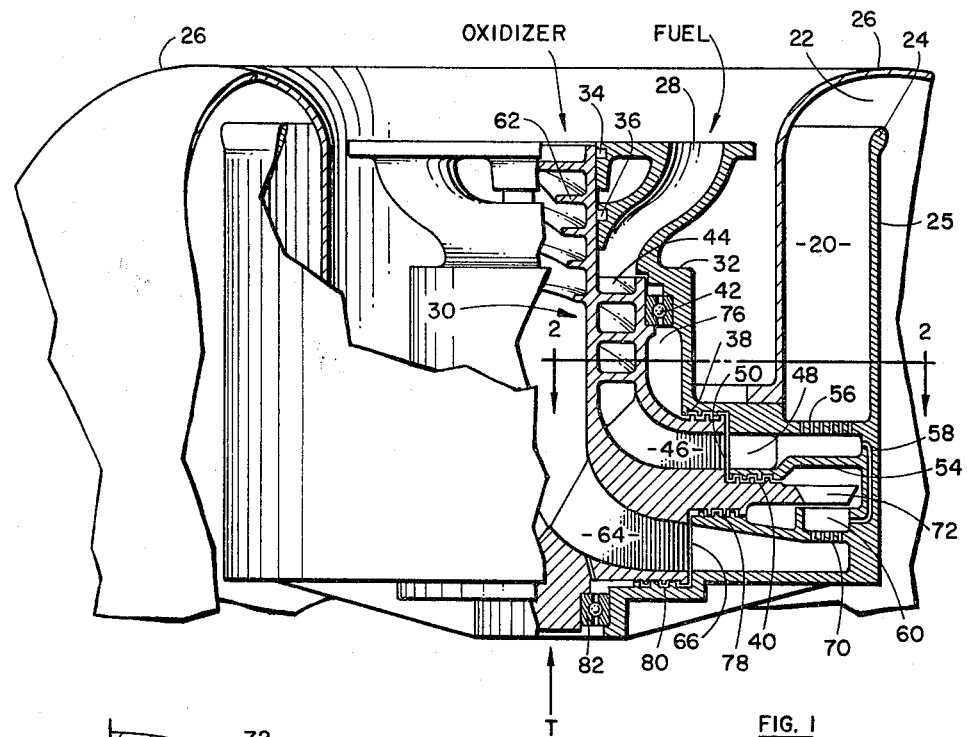
FIG. 1 is a partial side view, with parts broken away for clarity, of one embodiment of this invention.
Figure 2:
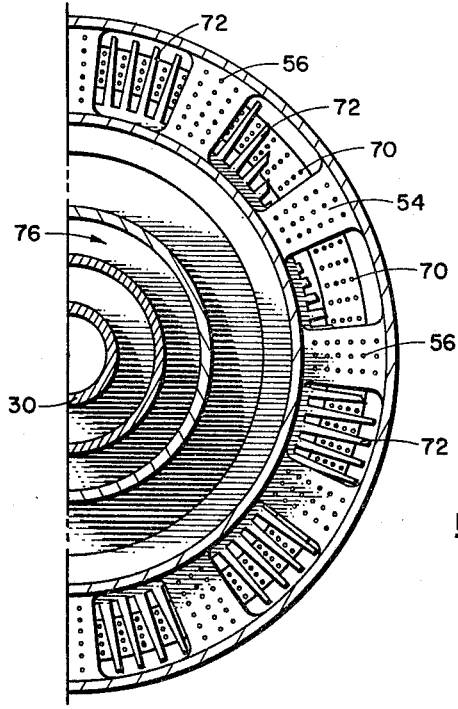
FIG. 2 is a partial view with portions broken away and partially in cross-section along the lines 2—2 of FIG. 1.

Referring now to FIG. 1, a preferred embodiment of this invention, a rocket engine is shown which is constructed in accordance with the teachings of U.S. Patent application Serial No. 27,126 assigned to the assignee of this invention, with the exception of the integrated turbo-pump and injection system. Shown at 20 is an annular combustion chamber in which the propellants are combusted. The combustion gases pass through annular throat region 22 formed between lip 24 of wall 25 and nozzle 26 and then are re-directed by nozzle 26 in an axial direction rearwardly. This produces thrust to drive the vehicle in the direction of the arrow T. The construction so far is similar to that of the aforementioned application. However, in that application, separate means must be supplied to force the propellants into the combustion chamber. In this case, an integrated turbine and pump assembly is provided interiorly of the combustion chamber to maximize the use of space available while providing a compact, efficient and relatively simple apparatus. In the embodiment shown in FIG. 1, fuel from propellant tanks not shown are introduced into ducts 28. The integrated pump and turbine assembly is indicated generally at 30. This assembly 30 will rotate relative to structure 32 in which duct 28 is located. Structure 32 is attached to or formed as part of the nozzle 26. Structures 25 and 32 are preferably made of separate parts to allow assembly of the pump and turbine structure in the engine. The term integral is intended to include both one-piece and separate attached structures. Seals 34 and 36 and labyrinth seals 38 and 40 are shown to minimize leakage from duct 28. Bearing 42 is shown for support between turbopump 30 and structure 32. Turbopump 30 is rotated by means to be explained later and the fuel entering duct 28 is forced in a downward direction by impellers 44. Pump vanes 46 are also provided to aid in producing a high flow under pressure to the volume or manifold indicated generally at 48. It should be noted that the fuel entering manifold 48 passes through annular opening 50 around the turbopump assembly. The fuel passing into volume 48 is then injected through injector orifices 56 located on ribs 54. These ribs, when viewed from the top (FIG. 2) appear as spokes. While orifices 56 are pictured as being vertical, it is within the scope of the invention to inject the fuel horizontally in order to provide a better mixing of fuel and oxidizer. However, a portion of the fuel is passed through tap-off 58 to be injected into volume 60. The oxidizer is similarly led into its injector by means of inducer blades 62 from the oxidizer tank not shown. The fuel then passes downward and is elevated to a relatively high pressure and flow by blades 64. As in the case of fuel, the oxidizer passes through annular opening 66 into volume 68. Injactor openings are provided and shown at 70 so that the oxidizer is then passed into volume 60. Since a portion of the fuel is in volume 60 by reason of tap-off 58 from volume 48, the two propellants are mixed and then ignited by conventional means. This ignition may be hypergolic, or by the use of a pyrotechnic igniter or ignition slug. This oxidizer-rich mixture then passes by turbine blades 72 and by reason of the partial combustion of the fuel, impinges on the blades 72 to cause rotation of the turbopump assembly 30. Turbine blades 72 are integral with or affixed to turbopump 30. This oxidizer-rich mixture of gas is relatively cool and when passing by the turbine blades 72 and ribs 54 will tend to maintain these parts at a relatively low temperature. As the oxidizer-rich mixture passes by the injector or rib 54, the remaining fuel injected thereby will thoroughly mix with the oxidizer causing final combustion in combustion zone 20. Accordingly, the volume 60 between the injector 70 and the plane formed by ribs 54 may be termed a pre-combustion chamber while volume 20 (formed between the plane of ribs 54 and throat area 22) may be termed the main combustion chamber. This mixture of hot combustion gases then passes through throat area 22 and re-directed axially rearwardly by nozzle 26 in the manner described in the aforementioned patent application, Serial No. 27,126.

This type of construction negates the necessity for absolute sealing. Any fuel which will leak from duct 28 will tend to pass into either volume 76 or the combustion chamber 20. Since the combustion chamber is where the fuel is to be directed anyway, it is therefore not a problem. As to volume 76, it is a relatively simple matter to either provide an inert purge therein or to tap-off any leakage that does occur back into the propellant duct 28. As to the oxidizer, any tendency for leakage past seal 78 will be directed into volume 60 or into the thrust chamber itself which creates no problem. For that matter, a certain amount of controlled leakage past seal 80 is desirable to hydrostatically cool bearings 82. This same type of leakage past seal 38 aids in cooling bearings 42.

By the use of this construction, the complexity of the turbopumps, since they are integrated, is simplified as in most cases it is substantially a one piece construction. Close sealing tolerances are negated as sealing is not a problem and the space interiorly of the combustion chamber is utilized to full advantage. Also, it can be seen that the turbine power delivered to the pumps is a function of the amount of propellants which is desirable. Thus, as the fuel and oxidizer flow is decreased by upstream valves, not shown, the amount of propellants available for combustion is decreased thus slowing down the turbine and hence the pump. At the same time, the flow requirements of the pumps is decreased.

Figures 3, 4:
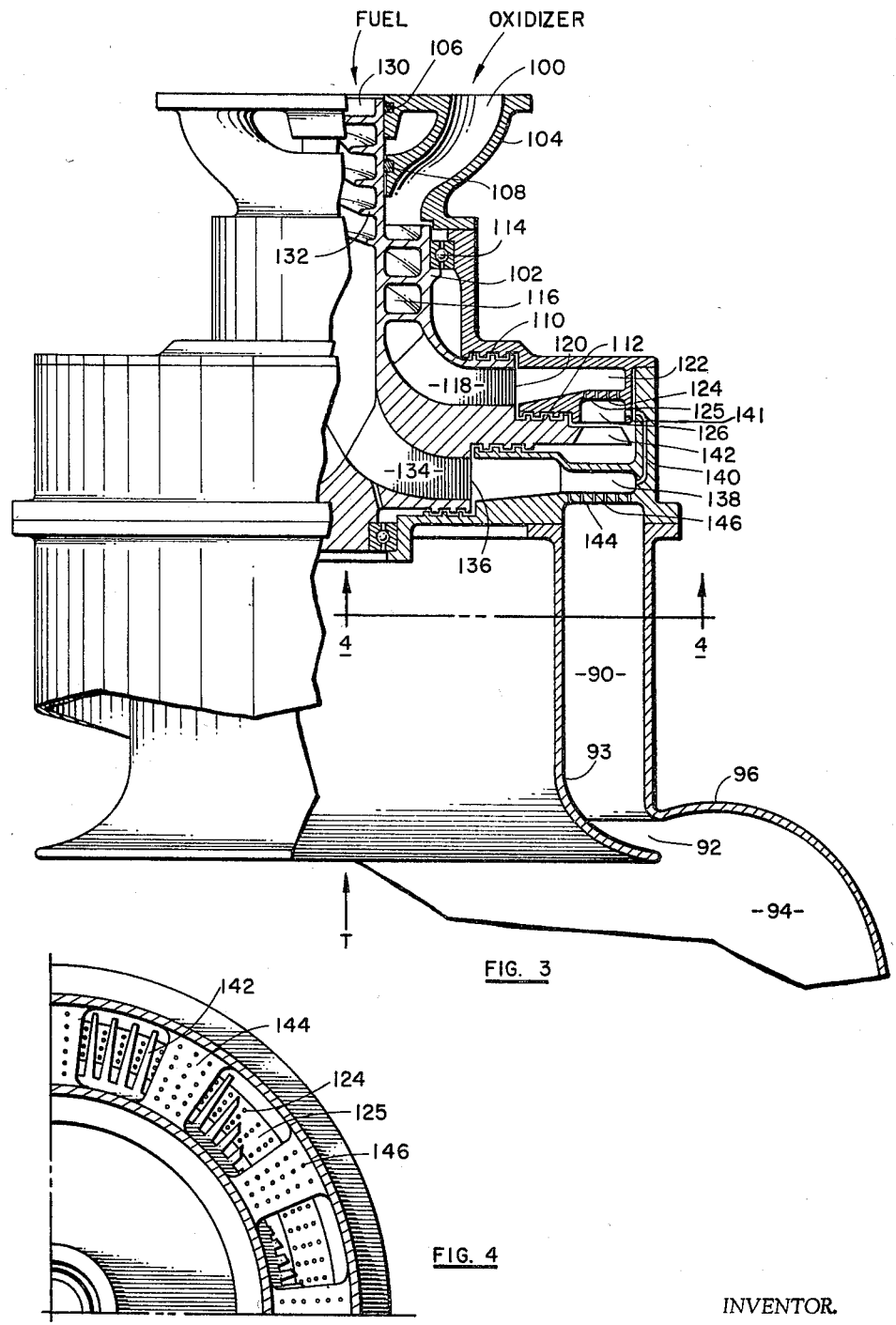
FIG. 3 is a partial side view with portions broken away of another embodiment of this invention.
FIG. 4 is a partial view with portions broken away and partially in cross-section, along the lines 4—4 of FIG. 3.

In FIG. 3, another embodiment of this invention is shown which is similar to that described with reference to FIG. 1 except that a different type of thrust chamber construction is shown. The thrust chamber and nozzle confifuration is similar to that described in U.S. patent application Serial No. 27,128 assigned to the assignee of this invention. This is the so-called "E-D" or expansion-deflection nozzle. The combustion gases generated in combustion chamber 90 pass through throat area 92 formed between plug 93 and nozzle 96 where they are accelerated and passed into thrust chamber 94 formed by nozzle 96. In this embodiment, as in the previous embodiment, fuel is introduced into ducts 100 from lines leading from propellant tanks not shown and thence into the turbopump assembly 102. At 104 is indicated generally the stationary structure. Seals 106 and 108 are provided along with labyrinth seals 110 and 112. A bearing 114 is provided for rotational support. Indicated at 116 are the inducer blades which initially pressurize the fuel from duct 100 from whence it is further pressurized by blades 118 and passes out annular opening 120. The fuel is then collected in volume 122 and injected through injector orifices 124 in injector 125 and into pre-combustion chamber 126. At the same time, oxidizer is conveyed from propellant tanks not shown into oxidizer duct 130 in turbopump assembly 102. Blades 132 propel the oxidizer downwardly to where the blades 134 force the oxidizer through annular openings 136 into chamber 138. A portion of this oxidizer is tapped off through port 140 and apertures 141 into pre-combustion chamber 126 where pre-combustion occurs. This fuel-rich mixture then passes by turbine blades 142 and around rib 144. This, as in the previous embodiment, powers the turbopump. The remaining oxidizer is injected into the combustion chamber 90 through orifice 146 where final combustion then takes place in combustion chamber 90 similar to that previously described. FIG. 4 illustrates the way in which the gases from the pre-combustion chamber bypass the ribs 144 and the turbine blades 142.

While each of the embodiments have described a particular path for the various propellants, whether fuel or oxidizer, it is within the scope of this invention to provide that the two may be interchanged. One of the important considerations that dictates which of the propellants is to be injected into which chamber is the problem of heat in the neighborhood of the turbine blades and ribs. Depending on the choice of propellant, the most desirable procedure would be to utilize that propellant having the highest heat capacity to be injected into the pre-combustion chamber so that a greater amount of heat may be absorbed and a relatively cooler gas results for flow past the turbine blades and secondary injector. While this invention has been described as an integral system, the term integral is intended to include separate elements which are attached and operate in the same manner as a one piece construction.

In both of these embodiments, the operation is as follows. Fuel and oxidizer led from the propellant tanks are introduced into the respective portions of the pump assembly. Means such as a gas generator (not shown) is employed to initiate rotation of the turbine. The generator would be positioned to impinge gases on the turbine blades and after starting would burn out. Since the pump assembly is rotating under influence of the turbine blades, the propellants are pumped into the injector assemblies with a portion passing into the pre-combustion chamber and eventually to the main combustion chamber. In this manner, the propellants are pumped into the rocket engine without the need for a separate and continuous gas generating system to drive separate turbines and pumps.

While this invention has been described with reference to particular embodiments, it is obvious that changes may be made within the scope of this invention without departing from the scope thereof.

I claim:

1. An integrated turbine and pump assembly for a rocket engine having a main combustion chamber and a thrust chamber comprising;
   a first rotatable pump,
   a second rotatable pump integral with and concentrically arranged to said first pump,
   a plurality of turbine blades affixed to and adapted to drive said pumps,
   fixed injector means for each of said pumps,
   a pre-combustion chamber adjacent one of said injector means and adapted to receive fluid therefrom,
   means to convey fluid to said precombustion chamber from the other of said injector means whereby fluid from each of said injector means will mix to form combustion gases, said turbine blades being adapted to be driven by said combustion gases in said pre-combustion chamber so as to rotate said pumps.

2. An integrated turbine and pump assembly for a rocket engine having a main combustion chamber and thrust chamber comprising;
   a first pump rotatable relative to said thrust chamber,
   a second pump rotatable relative to said thrust chamber integral with and concentrically arranged to said first pump, each of said pumps having an outlet,
   a plurality of turbine blades affixed to and adapted to drive said pumps, injector means for each of said pumps adapted to receive fluid therefrom, said injector means being non-rotatable relative to said pumps, a pre-combustion chamber adjacent one of said injector means and adapted to receive fluid therefrom, means to convey fluid to said pre-combustion chamber from the other of said injector means whereby fluid from each of said injector means will mix to form combustion gases, said turbine blades being adapted to be driven by said combustion gases in said pre-combustion chamber so as to rotate said pumps.

References Cited by the Examiner
UNITED STATES PATENTS

| | | | |
|---|---|---|---|
| 3,036,428 | 5/1962 | Chillson | 60—35.6 |
| 3,091,921 | 6/1963 | Youngquist et al. | 60—35.6 |
| 3,127,739 | 4/1964 | Miller | 60—35.6 |
| 3,128,601 | 4/1964 | Abild | 60—35.6 |

MARK NEWMAN, *Primary Examiner.*

D. HART, *Assistant Examiner.*